(12) United States Patent
Chiou (10) Patent No.: US 8,919,221 B2
(45) Date of Patent: *Dec. 30, 2014

(54) CABLE GLAND AND GASKET RING ASSEMBLY

(71) Applicant: AVC Industrial Corp., Taipei County (TW)

(72) Inventor: Jiun Wei Chiou, Taipei County (TW)

(73) Assignee: AVC Industrial Corp., Taipei County (TW)

( * ) Notice: Subject to any disclaimer, the term of this patent is extended or adjusted under 35 U.S.C. 154(b) by 31 days.

This patent is subject to a terminal disclaimer.

(21) Appl. No.: 13/845,404

(22) Filed: Mar. 18, 2013

(65) Prior Publication Data

US 2013/0213176 A1    Aug. 22, 2013

Related U.S. Application Data

(62) Division of application No. 12/728,190, filed on Mar. 19, 2010, now Pat. No. 8,490,513.

(51) Int. Cl.
*F16C 1/12* (2006.01)
*F16C 1/10* (2006.01)
*F16C 1/26* (2006.01)
*H02G 3/06* (2006.01)

(52) U.S. Cl.
CPC .............. *F16C 1/107* (2013.01); *F16C 1/102* (2013.01); *F16C 1/262* (2013.01); *H02G 3/0641* (2013.01); *H01G 3/0675* (2013.01)
USPC .......... 74/502.4; 74/502.6; 174/520; 439/583

(58) Field of Classification Search
CPC .......... F16C 1/102; F16C 1/107; F16C 1/262; H02G 3/0691
USPC .............. 285/52, 288.1, 382.7; 174/520, 480, 174/653, 660; 439/583, 462
See application file for complete search history.

(56) References Cited

U.S. PATENT DOCUMENTS 3,848,905 A * 11/1974 Hammer et al. ........... 285/288.1
5,308,122 A * 5/1994 Crawford et al. ............... 285/52
(Continued)

FOREIGN PATENT DOCUMENTS

WO    WO 2010/099803 A1 * 9/2010 ................ F16C 1/26

*Primary Examiner* — Vinh Luong
(74) *Attorney, Agent, or Firm* — Chun-Ming Shih; HDLS IPR Services (57) ABSTRACT

A cable gland and gasket ring assembly includes a gasket ring and a cable gland formed of a shell, a collar, a packing ring and a connection ring for securing a cable to a junction box. The gasket ring is an annular member, having a first end face, a second end face opposing the first end face, a plurality of annular ribs concentrically arranged on the first end face and an annular convex portion located on the second end face, which is mounted on the first connection ring segment for enabling the annular ribs to be stopped against the stop face and a tapered inner surface located on the inside of the stop flange segment for stopping against a tapered outside surface of the packing ring. The packing ring further has at least one outer annular groove extending around the periphery of the second packing ring segment thereof.

2 Claims, 11 Drawing Sheets

(56) References Cited

U.S. PATENT DOCUMENTS

| | | | |
|---|---|---|---|
| 6,737,584 B2 * | 5/2004 | Kiely | 174/656 |
| 7,431,343 B2 * | 10/2008 | Chiu | 285/151.1 |
| 7,563,993 B2 * | 7/2009 | Drotleff et al. | 174/655 |
| 8,288,667 B2 * | 10/2012 | Chiou | 174/652 |
| 8,367,944 B2 * | 2/2013 | Chiou | 174/520 |
| 8,485,062 B2 * | 7/2013 | Chiou | 74/502.4 |

* cited by examiner

CABLE GLAND AND GASKET RING ASSEMBLY

RELATED APPLICATIONS

This application is a divisional application of U.S. patent application Ser. No. 12/728,190, filed on Mar. 19, 2010.

BACKGROUND OF THE INVENTION

1. Field of the Invention

The present invention relates to cable glands and more particularly, to a cable gland and gasket ring assembly, which effectively prohibits access of dust and water particles to the inside of the junction box after installation of a cable with the cable bland in the junction box.

2. Description of the Related Art

After installation of a cable in a junction box by means of a cable gland, the cable may be disconnected or loosened from the connector or gland when stretched accidentally by an external force, causing leakage. To avoid this problem, an improved design of cable gland is disclosed. This prior art design of cable gland comprises a first shell, a packing ring, a sealing nut, a lock nut, a connection ring, an inner retaining ring, an elastic ring and a second shell. After installation, the packing ring is forced to wrap about the cable tightly, thereby locking the cable and protecting against moisture.

The water seal ring used in the aforesaid prior art cable gland is simply a rubber O-ring or rubber pad. When the rubber O-ring or rubber pad is sandwiched between the cable gland and the junction box of the signal source or signal receiver, it tends to be stretched or excessively deformed, leading in insufficient leakage protection.

Further, because the rubber O-ring or rubber pad has two opposite sides thereof respectively stopped against a planar wall surface at the junction box and a planar wall surface at the cable gland, a big number of dust particles and water particles may fall from the surfaces of the rubber O-ring or rubber pad, the cable gland and the junction box to the inside of the junction box to erode the internal circuit structure of the junction box.

Further, if the applied rotary force surpasses the pressure-bearing threshold of the rubber O-ring or rubber pad when fastening the cable gland to the junction box through a rotary motion, the rubber O-ring or rubber pad may be forced out of position, causing leakage.

Further, before installation of the cable gland in a junction box or during delivery of the cable gland, the rubber O-ring or rubber pad may fall from the cable gland accidentally.

Therefore, it is desirable to provide a gasket ring for cable gland, which eliminates the aforesaid problems.

SUMMARY OF THE INVENTION

The present invention has been accomplished under the circumstances in view. It is therefore the main object of the present invention to provide a cable gland and gasket ring assembly for securing a cable, or, a cable and a flexible conduit, which effectively locks the installed cable and flexible conduit to protect against moisture and dust.

It is another object of the present invention to provide a cable gland and gasket ring assembly, which has a foolproof design, avoiding inaccurate installation.

It is still another object of the present invention to provide a cable gland and gasket ring assembly, which enables the gasket ring to be rotated on the locating groove around the periphery of the connection ring, avoiding excessive deformation or leakage when the connection ring of the cable gland is threaded into a junction box tightly.

It is still another object of the present invention to provide a cable gland and gasket ring assembly, which holds down the installed cable and flexible conduit tightly.

To achieve these and other objects of the present invention, a cable gland and gasket ring assembly comprises a cable gland and a gasket ring for securing a cable, or, a cable and a flexible conduit, to a junction box. The gasket ring is an annular member defining along the axis thereof a first end face and a second end face opposing the first end face. The first end face has a plurality of concentrically arranged annular ribs. The second end face has an annular convex portion.

The cable gland comprises a connection ring connectable to a junction box. The connection ring comprises a stop flange segment, a first connection ring segment axially extended from one side of the stop ring segment and a first outer thread extending around the periphery of the first connection ring segment for mounting. The stop flange segment has a stop face abutted against the first connection ring segment. The gasket ring is mounted on the first connection ring segment of the connection ring for enabling the annular ribs at the first end face or the annular convex portion at the second end face to be selectively stopped against the stop face of the stop flange segment of the connection ring.

Further, the stop flange segment of the connection ring has a recessed portion located on the stop face thereof. The gasket ring is mounted on the first connection ring segment of said connection ring to force the convex portion thereof into engagement with the recessed portion of the stop flange segment of the connection ring.

The connection ring further has a locating groove extending around the periphery of the connection area between the stop flange segment and the first connection ring segment for the positioning of the gasket ring.

The connection ring further has a tapered inner surface located on an inside of the stop flange segment for stopping against a part of the packing ring.

The cable gland further comprises a shell, collar inserted in the shell, and a packing ring mounted in the collar and compressible by the collar to wrap about a cable. The shell has an axial through hole surrounded by an inside wall thereof, a tapered inner surface formed on the inside wall and an inner thread formed on the inside wall. The collar has an axial through hole, a beveled outer end edge suspending outside the axial through hole and stoppable against the tapered inner surface of the shell and a protruding inner stop portion suspending inside the axial through hole.

Further, the packing ring has a first packing ring segment, a second packing ring segment axially formed integral with one end of the first packing ring segment and an axial through hole surrounded by the first packing ring segment and the second packing ring segment for the insertion of a cable, or a flexible conduit and a cable in the flexible conduit. The second packing ring segment defines a tapered outer surface. The first packing ring segment has an outside annular groove extending around the periphery thereof for receiving the protruding inner stop portions of the collar.

The connection ring further comprises a second connection ring segment axially extended from an opposite side of the stop ring segment opposite to the first connection ring segment, a second outer thread extending around the periphery of the second connection ring segment. The outer shell has an inner thread threaded onto the second outer thread of the connection ring. The tapered outer surface of the packing ring is stopped against the tapered inner surface of the connection ring and forced to wrap about the periphery of an inserted cable upon threading of the inner thread of the shell onto the second outer thread of the connection ring.

The packing ring further has at least one outer annular groove extending around the periphery of the second packing ring segment thereof. Thus, the tapered end part of the packing ring can be cut off properly subject to the diameter of the cable to be installed.

Further, the packing ring has a hooked portion inwardly protruded from and extending along an inside wall thereof for engaging into a groove on a flexible conduit being inserted with a cable into the cable gland.

DETAILED DESCRIPTION OF THE PREFERRED EMBODIMENT

Referring to FIGS. 1~5, a cable gland and gasket ring assembly 100 in accordance with a first embodiment of the present invention is shown comprising a gasket ring 10 and a cable gland 20.

Figure 1:
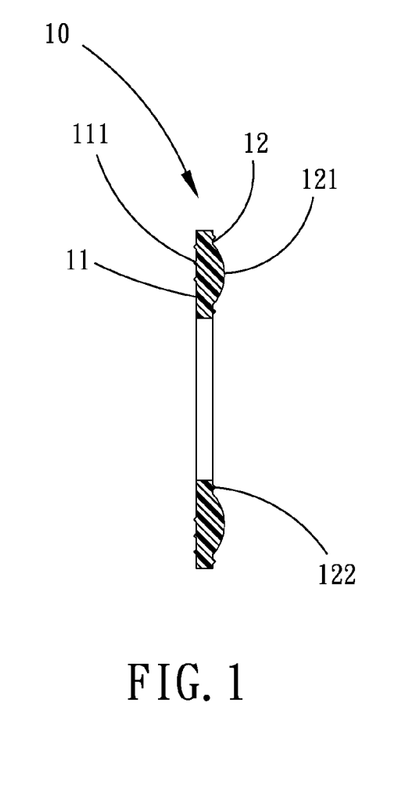
FIG. 1 is a sectional side view of gasket ring for cable gland and gasket ring assembly in accordance with the present invention.
Figure 2:
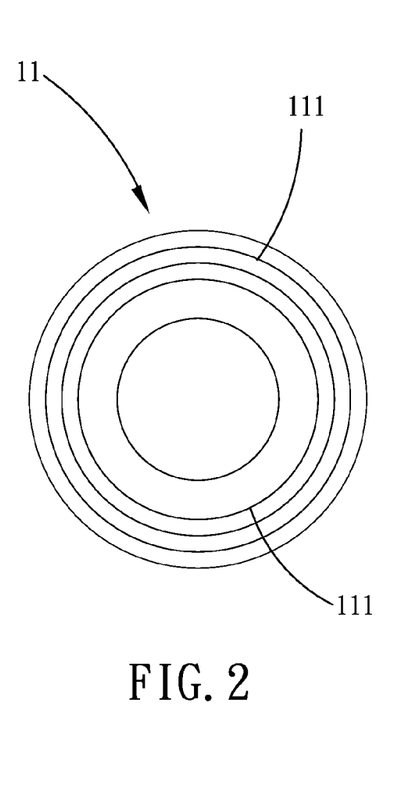
FIG. 2 is a front end view of the gasket ring shown in FIG. 1.
Figure 3:
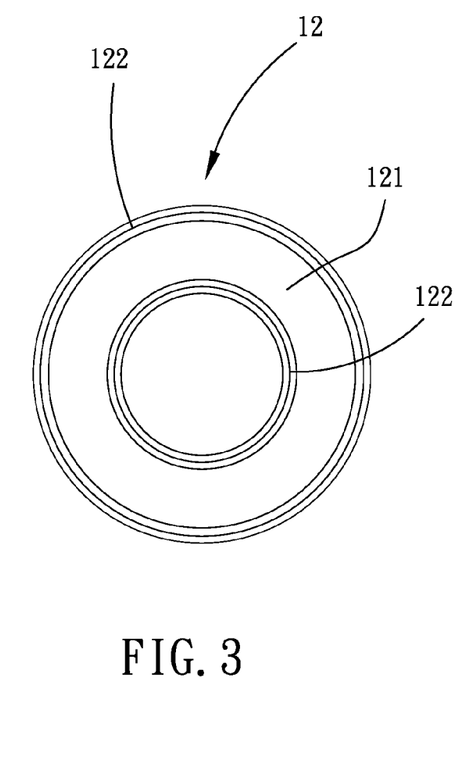
FIG. 3 is a rear end view of the gasket ring shown in FIG. 1.

Referring to FIGS. 1 and 3, the gasket ring 10 is prepared from an elastically deformable material, for example, rubber, defining along the axis thereof a first end face 11 and a second end face 12 opposing the first end face 11. The first end face 11 has a plurality of concentrically arranged annular ribs 111. The second end face 12 has an annular convex portion 121 and at least one annular rib 122 surrounded by the annular convex portion 121.

Figure 4:
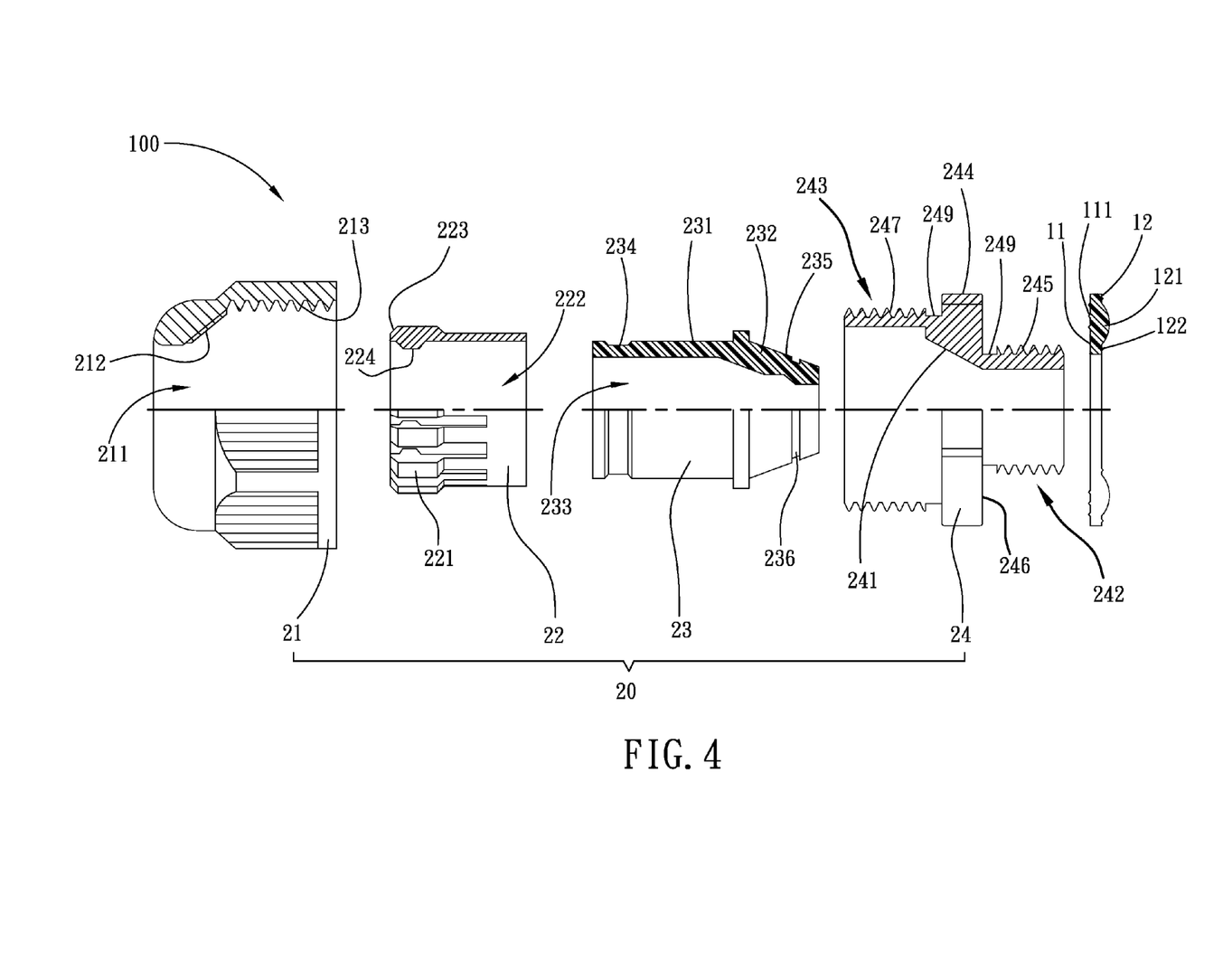
FIG. 4 is an exploded view in section of a cable gland and gasket ring assembly in accordance with a first embodiment of the present invention.
Figure 5:
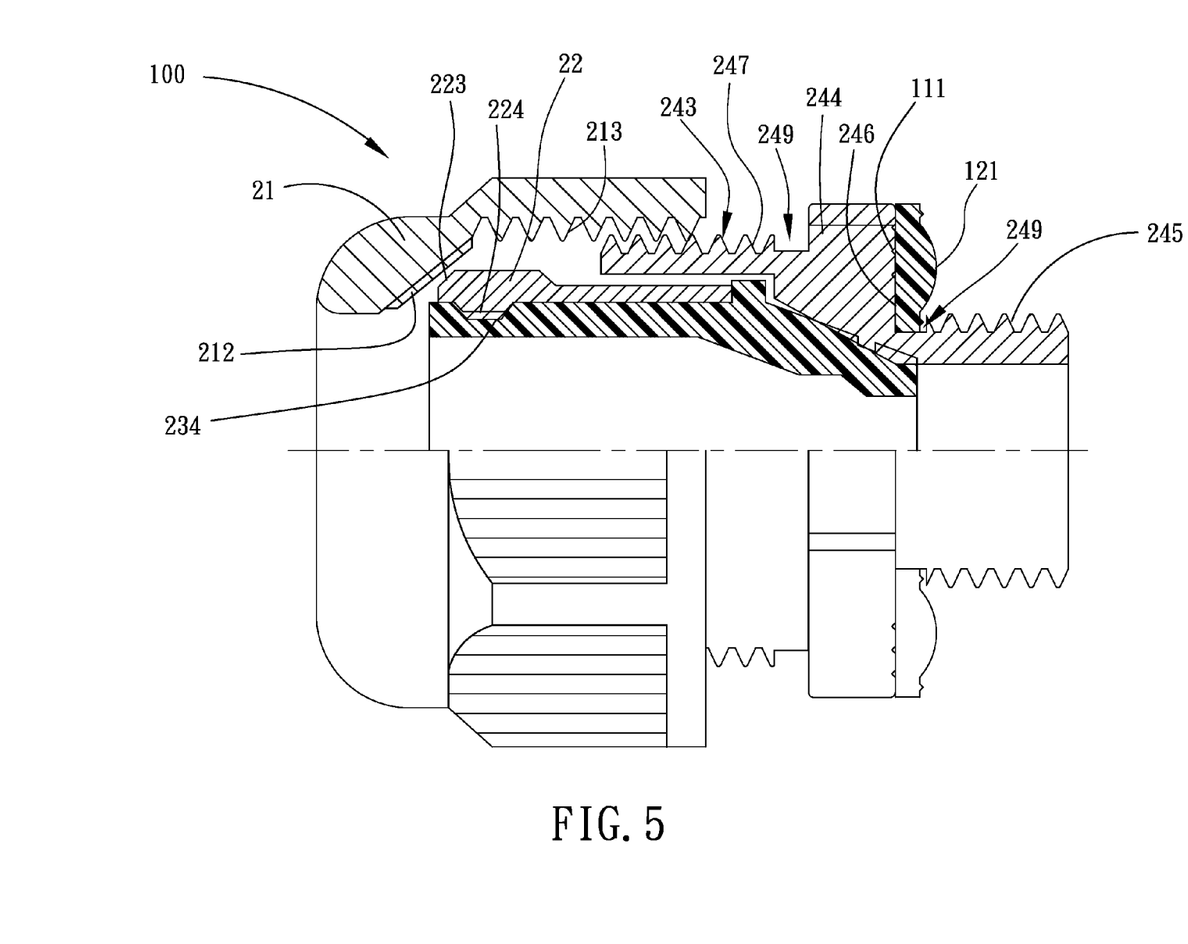
FIG. 5 is a sectional assembly view of the cable gland and gasket ring assembly in accordance with the first embodiment of the present invention.
Figure 7:
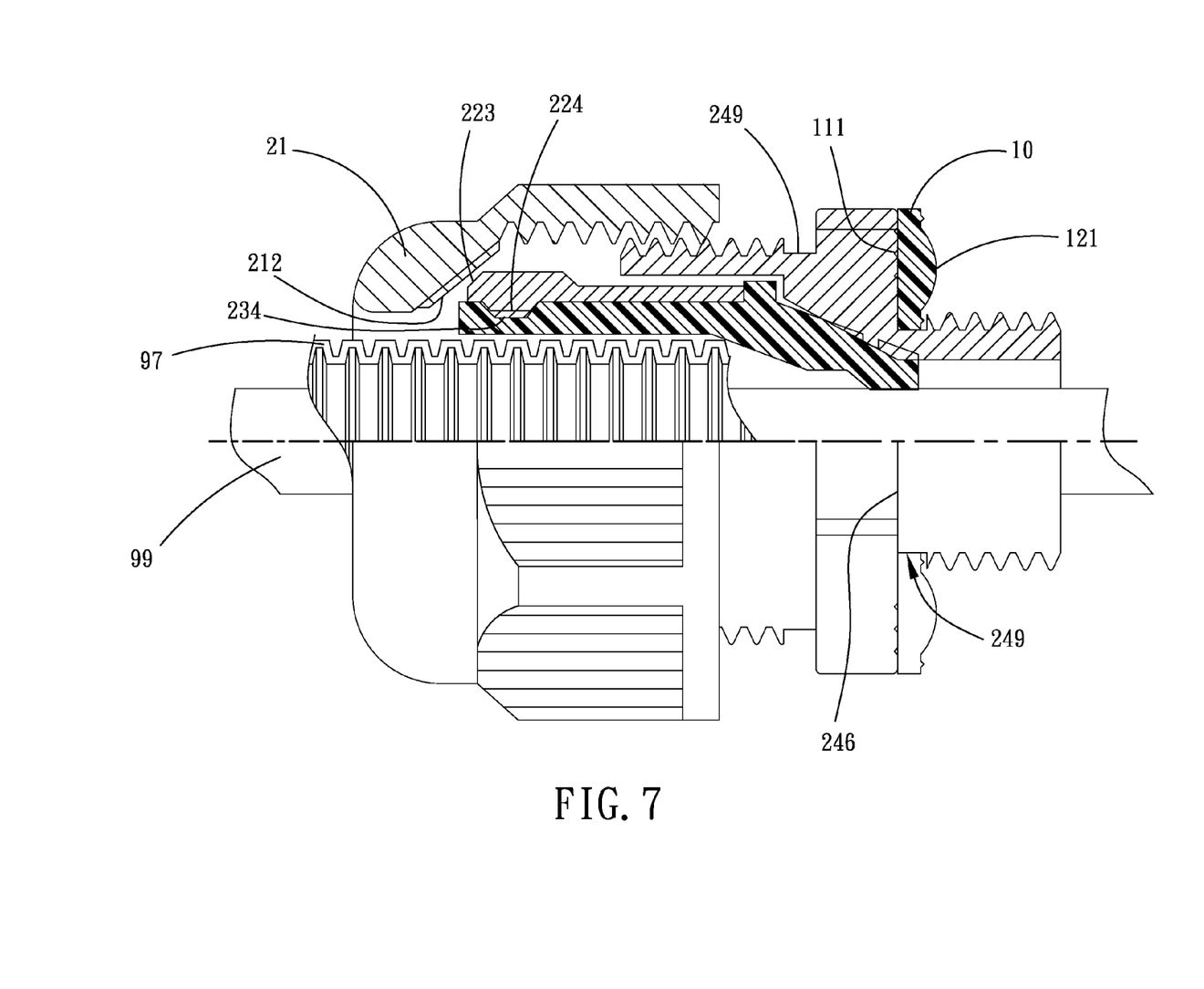
FIG. 7 is another schematic sectional applied view of the first embodiment of the present invention, shown the packing ring wrapped about a cable and a flexible conduit tightly.

Referring to FIGS. 4 and 7, the cable gland 20 comprises a shell 21, a collar 22, a packing ring 23 and a connection ring 24. The connection ring 24 is a tubular member comprising a stop flange segment 244 located on the middle, a first connection ring segment 242 axially extended from one side of the stop flange segment 244, a second connection ring segment 243 axially extended from the other side of the stop flange segment 244, a tapered inner surface 241 located on the inside of the stop flange segment 244, a first outer thread 245 extending around the periphery of the first connection ring segment 242, a second outer thread 247 extending around the periphery of the second connection ring segment 243. The outer diameter of the first connection ring segment 242 is smaller than the outer diameter of the stop flange segment 244 so that a stop face 246 is formed on one side of the stop flange segment 244 and abutted to the first connection ring segment 242.

During application, the gasket ring 10 is sleeved onto the first connection ring segment 242 of the connection ring 24 of the cable gland 20 (i.e., the first connection ring segment is inserted axially through the center of the gasket ring) to abut the first end face 11 of the gasket ring 10 against the stop face 246 of the stop flange segment 244 of the connection ring 24 of the cable gland 20. After threaded the first outer thread 245 of the first connection ring segment 242 into a screw hole of a junction box, the stop face 246 of the stop flange segment 244 of the connection ring 24 of the cable gland 20 is stopped against the annular ribs 111 of the gasket ring 10, preventing access of outside moisture and dust to the inside the junction box.

As illustrated, the gasket ring 10 is prepared from an elastically deformable material and shaped like an O-ring, having a plurality of annular ribs 111 concentrically arranged on the first end face 11 thereof and an annular convex portion 121 located on the second end face 12 thereof. Thus, the elastically deformable power of the gasket ring 10 is sufficient to overcome external twisting and compression force, avoiding damage.

The connection ring 24 of the cable gland 20 further has a locating groove 249 extending around the periphery of the connection area between the stop flange segment 244 and the first connection ring segment 242 or second connection ring segment 243. Thus, the gasket ring 10 can be positively mounted on the locating groove 249 between the stop flange segment 244 and the first connection ring segment 242. When the user carry the cable gland 20 to or in the work place, the gasket ring 10 will not fall from the cable gland 20.

Figure 8:
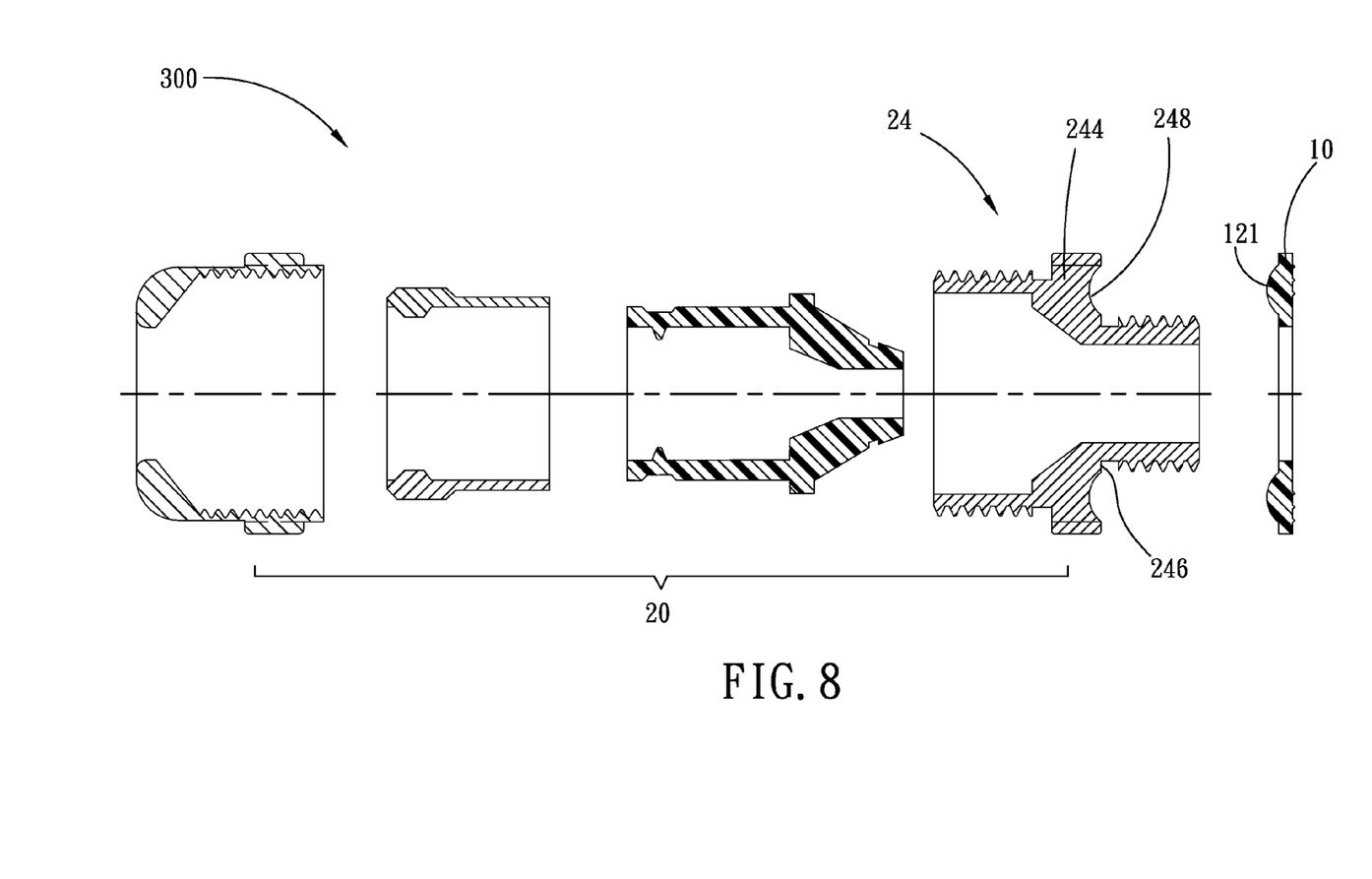
FIG. 8 is an exploded view in section of a cable gland and gasket ring assembly in accordance with a second embodiment of the present invention.

Referring to FIGS. 4, 7 and 8, the shell 21 of the cable gland 20 has an axial through hole 211, a tapered inner surface 212 formed on the inside wall of the axial through hole 211 and an inner thread 213 formed on the inside wall of the axial through hole 211.

The collar 22 is a tubular member having a plurality of pawls 221 spaced around the axial through hole 222 thereof. Each pawl 221 has a beveled outer end edge 223 suspending outside the axial through hole 222 and a protruding inner stop portion 224 suspending inside the axial through hole 222.

The packing ring 23 is prepared from an elastically deformable material, for example, rubber, having a first packing ring segment 231, a second packing ring segment 232 axially formed integral with one end of the first packing ring segment 231 and an axial through hole 233 surrounded by the first packing ring segment 231 and the second packing ring segment 232. The second packing ring segment 232 is shaped like a tapered tube gradually reducing in diameter from the first packing ring segment 231 toward the free end thereof, defining a tapered outer surface 235. The first packing ring segment 231 has an outside annular groove 234 extending around the periphery thereof.

During installation, insert the first packing ring segment 231 of the packing ring 23 into the axial through hole 222 of the collar 22 to force the outside annular groove 234 of the first packing ring segment 231 into engagement with the protruding inner stop portion 224 of the collar 22, and then insert the second packing ring segment 232 of the packing ring 23 into the inside of the connection ring 24, and than thread the second outer thread 247 of the connection ring 24 into the inner thread 213 of the shell 21 to abut the tapered inner surface 241 of the connection ring 24 against the tapered outer surface 235 of the packing ring 23 and to aim the beveled outer end edges 223 of the pawls 221 of the collar 22 at the tapered inner surface 212 of the shell 21.

Figure 6:
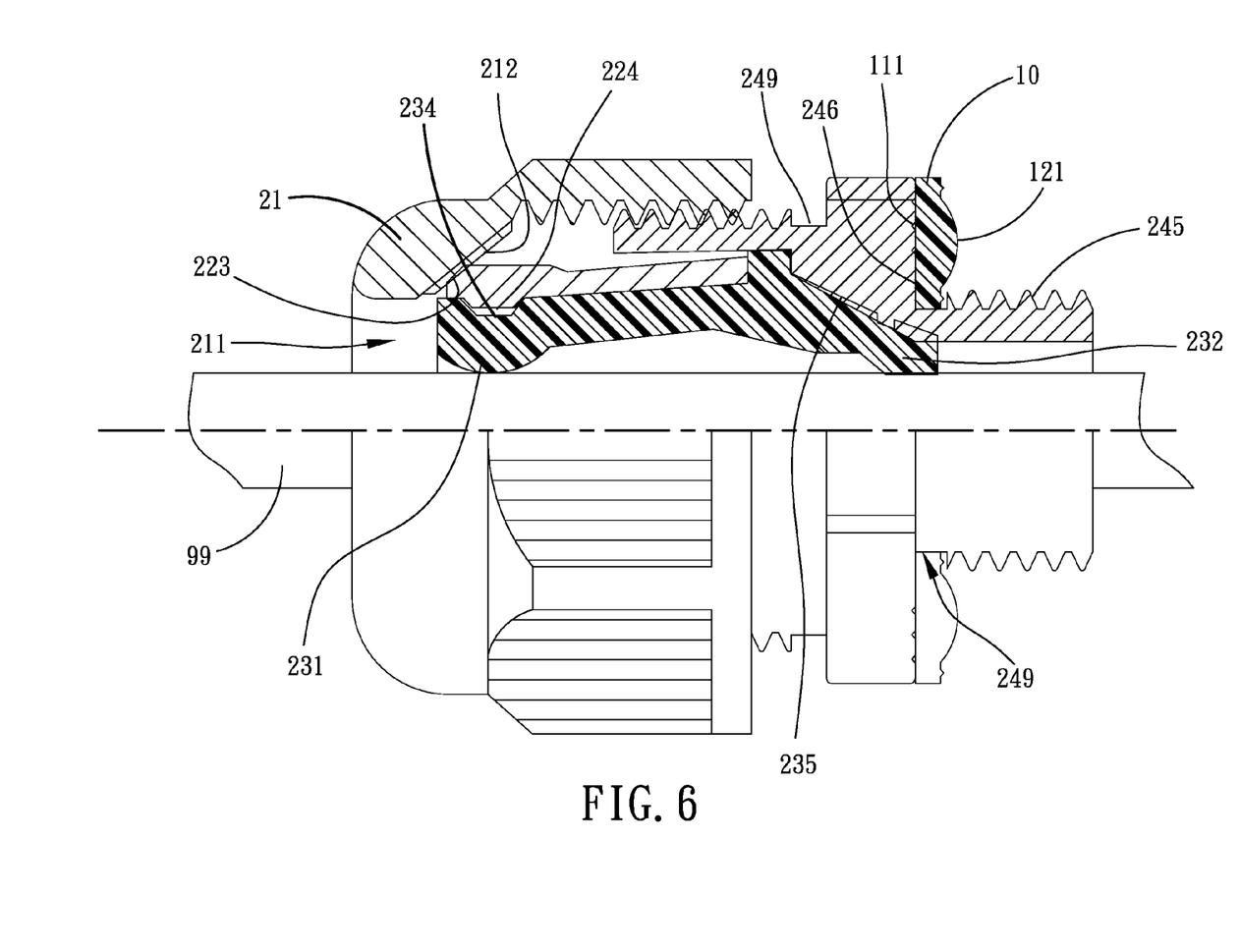
FIG. 6 is a schematic sectional applied view of the first embodiment of the present invention, shown the packing ring wrapped about a cable tightly.

When using the cable gland and gasket ring assembly 100 with a cable 99, as shown in FIG. 6, insert the cable 99 into the axial through hole 211 of the shell 21 and the axial through hole 233 of the collar 23, and then fasten tight the shell 21 (rotating the shell 21 tightly onto the connection ring 24) to force the tapered inner surface 212 of the shell 21 against the beveled outer end edges 223 of the pawls 221 of the collar 22, thereby compressing and deforming the first packing ring segment 231 of the packing ring 23. At this time, the inside wall of the first packing ring segment 231 of the packing ring 23 corresponding to the outside annular groove 234 is tightly wrapped about the outside wall of the cable 99, forming a first packing area. At the same time, the tapered outer surface 235 of the second packing ring segment 232 of the packing ring 23 is forced by the tapered inner surface 241 of the connection ring 24 against the outside wall of the cable 99, forming a second packing area. Thus, the aforesaid first packing area and second packing area achieve the expected double-lock function, prohibiting displacement of the cable 99 relative to the cable gland and gasket ring assembly 100.

When using the cable gland and gasket ring assembly 100 with a small diameter cable 99 being sleeved with a flexible conduit 97, one end of the cable 99 is inserted into the axial through hole 233 of the packing ring 23 of the cable gland and gasket ring assembly 100 to let the exposed part of the cable 99 (the part of the cable 99 that is not surrounded by the flexible conduit 97) be positioned in the second packing ring segment 232 and the flexible conduit 97 be positioned in the first packing ring segment 231. When the first packing ring segment 231 and the second packing ring segment 232 are compressed radially inwards, the first packing ring segment 231 is forced to wrap about the flexible conduit 97 tightly, and the second packing ring segment 232 is forced to wrap about the cable 99 tightly, achieving the same double-lock function.

Figure 9:
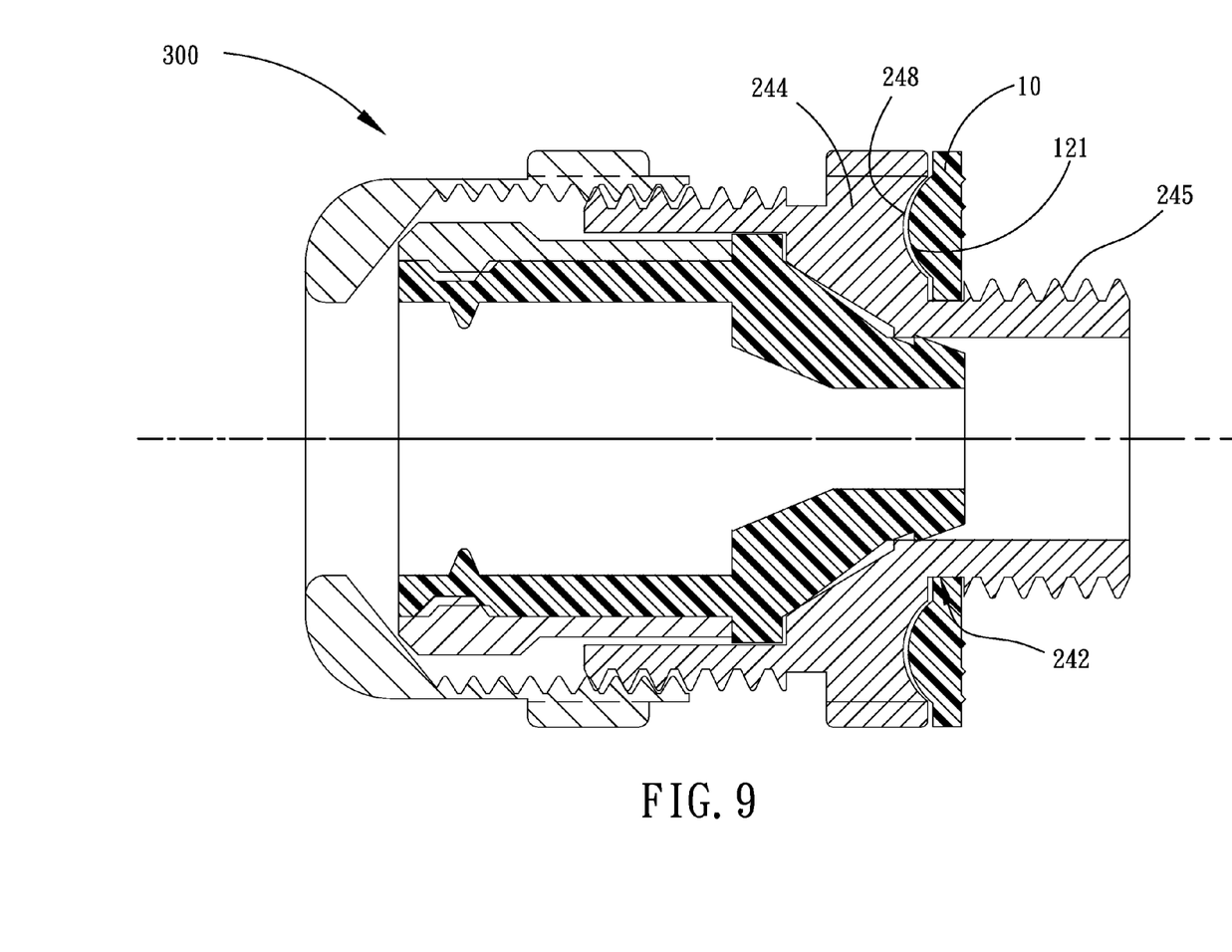
FIG. 9 is a sectional assembly view of the cable gland and gasket ring assembly in accordance with the second embodiment of the present invention.
Figure 10:
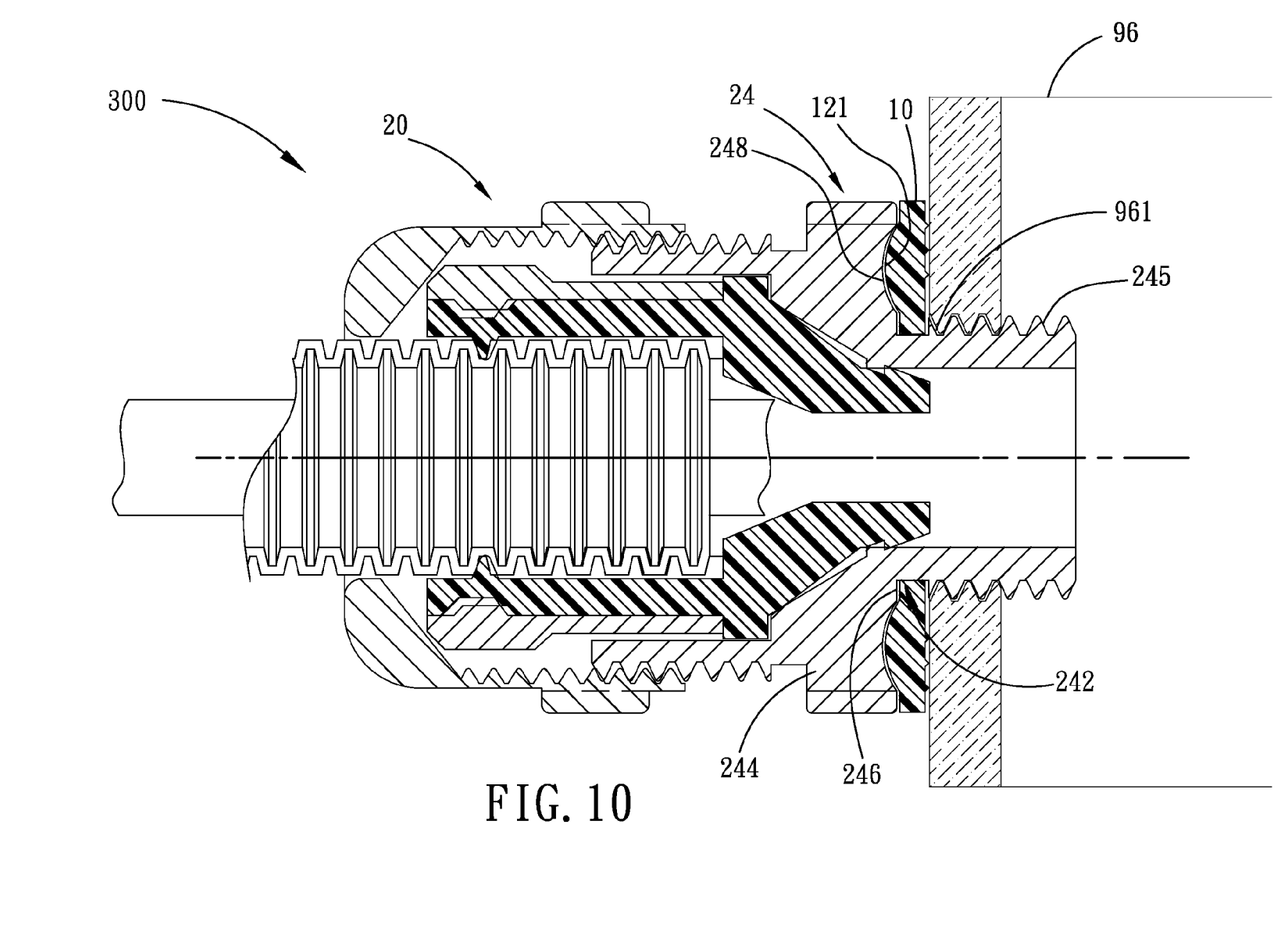
FIG. 10 is a schematic sectional applied view of the second embodiment of the present invention, showing the packing ring wrapped about a cable and a flexible conduit tightly.

FIGS. 8~10 illustrate a cable gland and gasket ring assembly 300 in accordance with a second embodiment of the present invention. According to this second embodiment, the double-lock cable and flexible conduit gland 300 comprises gasket ring 10 and a cable gland 20. The cable gland 20 is comprised of a shell 21, a collar 22, a packing ring 23 and a connection ring 24. This second embodiment is substantially similar to the aforesaid first embodiment with the exception that the stop flange segment 244 of the connection ring 24 of this second embodiment has a recessed portion 248 located on the stop face 246 thereof; the gasket ring 10 is mounted on the first connection ring segment 242 with the convex portion 121 thereof fitted into the recessed portion 248 of the connection ring 24.

When fastening the cable gland 20 to a junction box 96 by threading the first outer thread 245 of the first connection ring segment 242 into a screw hole 961 on the junction box 96, the annular ribs 111 of the gasket ring 10 are forced against the outside wall of the junction box 96 and the convex portion 121 of the gasket ring 10 is fitted into the recessed portion 248 of the connection ring 24, avoiding in accurate mounting and assuring accurate positioning. Further, when threading the first outer thread 245 of the first connection ring segment 242 into the screw hole 961 on the junction box 96 over the pressure-bearing threshold of the gasket ring 10, the gasket ring 10 is rotatable and will not be stuck, avoiding excessive deformation to cause leakage. Further, the matching design between the convex portion 121 of the gasket ring 10 and the recessed portion 248 of the connection ring 24 provide a foolproof installation guide.

Further, the formation of the at least one annular rib 122 on the second end face 12 of the gasket ring 10 enables the gasket ring 10 to prohibit access of external dust and water particles to the inside of the junction box 96 after installation of the cable gland and gasket ring assembly.

Further, the aforesaid flexible conduit 97 can be a coiled or bellows conduit prepared from metal, plastics or rubber.

Figure 11:
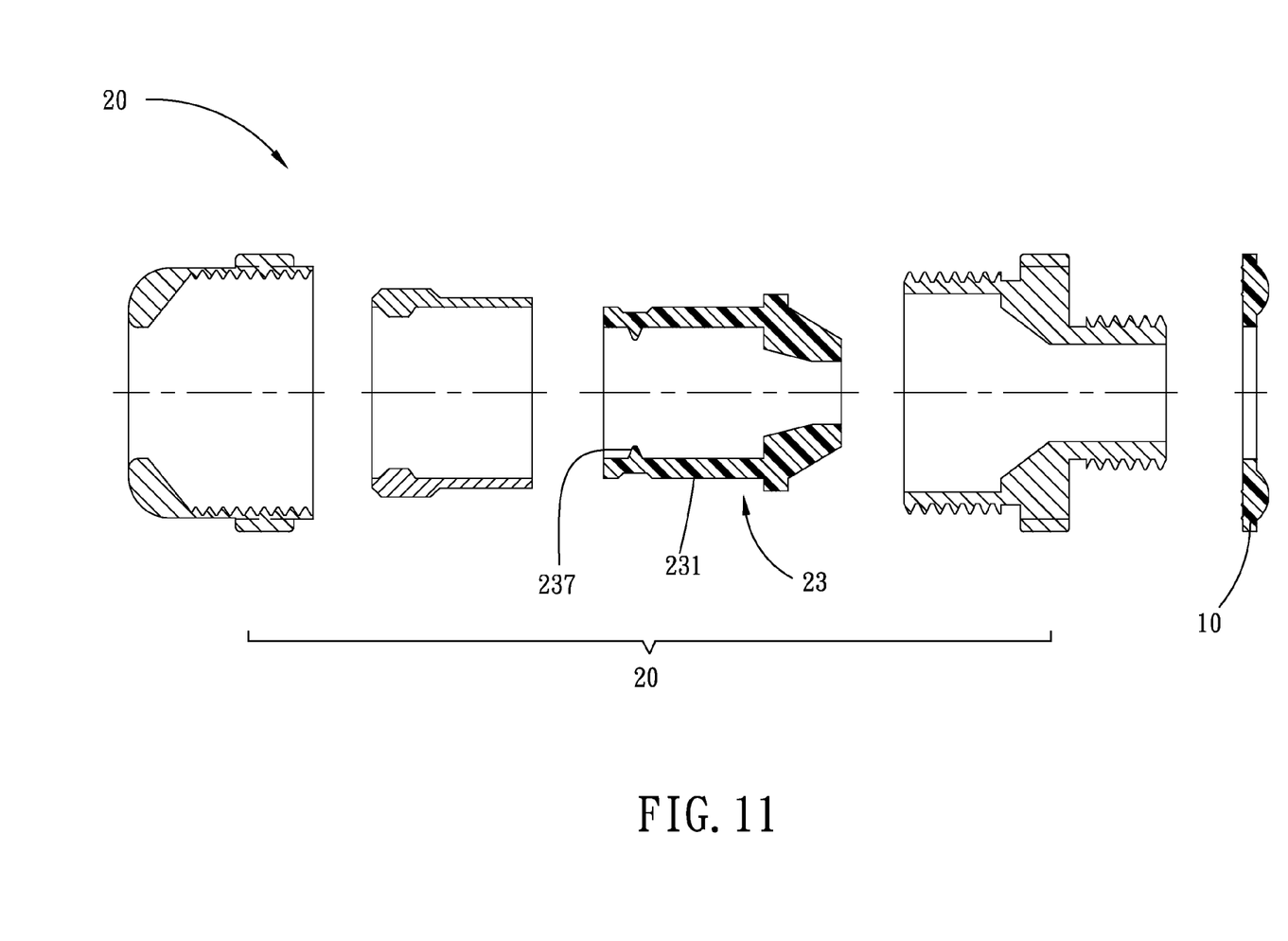
FIG. 11 is an exploded view in section of a cable gland and gasket ring assembly in accordance with a third embodiment of the present invention.
Figure 12:
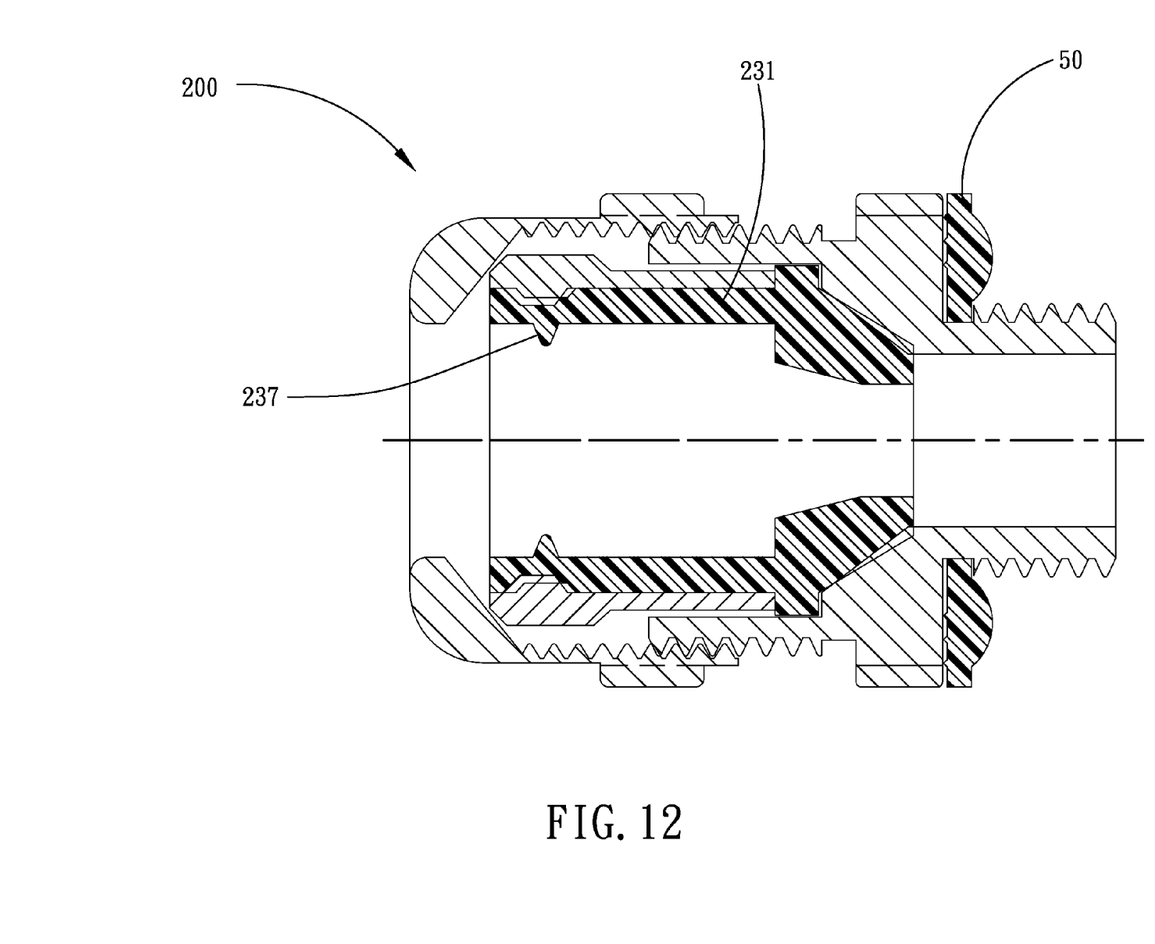
FIG. 12 is a sectional assembly view of the cable gland and gasket ring assembly in accordance with the third embodiment of the present invention.
Figure 13:
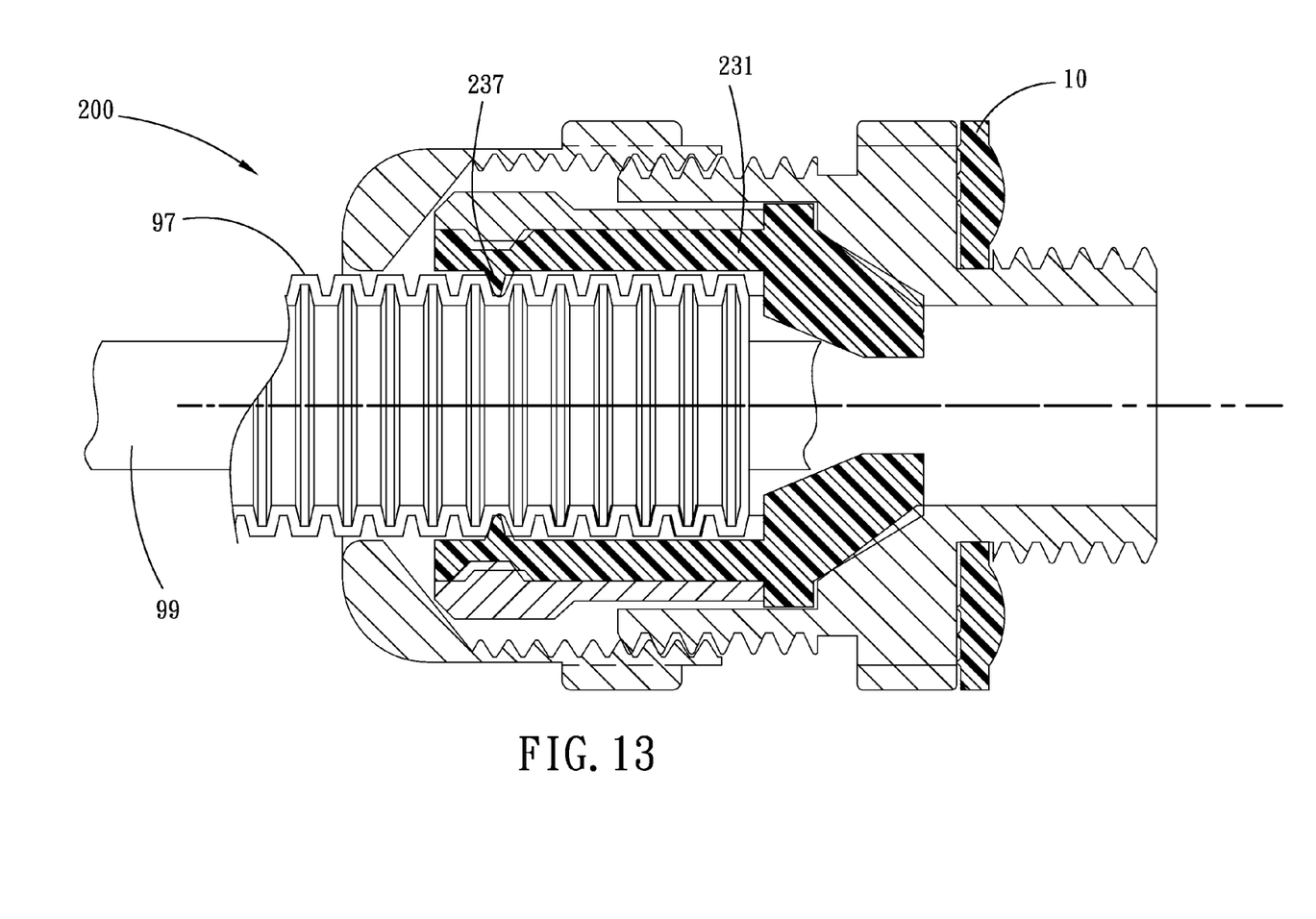
FIG. 13 is a schematic sectional applied view of the third embodiment of the present invention, showing the packing ring wrapped about a cable and a flexible conduit tightly.

FIGS. 11~13 illustrate a cable gland and gasket ring assembly 200 in accordance with a third embodiment of the present invention. According to this third embodiment, the cable gland and gasket ring assembly 200 comprises a gasket ring 10 and a cable gland 20. The cable gland 20 is substantially similar to the aforesaid second embodiment with the exception that the aforesaid packing ring 23 of the cable gland 20 according to this third embodiment further has a hooked portion 237 inwardly protruded from and extending along the inside wall of the first packing ring segment 231. After insertion of a cable 99 with a flexible conduit 97 into the packing ring 23, the hooked portion 237 is forced into engagement with a groove around the periphery of the flexible conduit 97, and thus the flexible conduit 97 is locked to the cable gland and gasket ring assembly 200.

The packing ring 23 further has an outer annular groove 236 extending around the periphery of the second packing ring segment 232. When the cable gland and gasket ring assembly 200 is used with a cable having a relatively greater outer diameter, the end part of the second packing ring segment 232 can be cut off along the outer annular groove 236 so that the second packing ring segment 232 can be compressed to wrap about the periphery of the cable tightly. Further, the cut-off length of the second packing ring segment 232 may be determined subject to the diameter of the cable to be installed.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cable gland and gasket ring assembly comprising a cable gland and a gasket ring for securing a cable or a flexible conduit to a junction box, wherein said gasket ring is an annular member defining along the axis thereof a first end face and a second end face opposing said first end face, said first end face having a plurality of concentrically arranged annular ribs, said second end face having an annular convex portion, wherein said cable gland comprises a connection ring connected to the junction box, said connection ring comprising a stop flange segment, a first connection ring segment axially extended from one side of said stop flange segment and a first outer thread extending around the periphery of said first connection ring segment for mounting, said stop flange segment having a stop face abutted against said first connection ring segment; said gasket ring is mounted on the first connection ring segment of said connection ring for enabling the annular ribs at said first end face to be stopped against the stop face of said stop flange segment of said connection ring, and wherein said packing ring further has at least one outer annular groove extending around the periphery of a second packing ring segment thereof.

2. A cable gland and gasket ring assembly comprising a cable gland and a gasket ring for securing a cable or a flexible conduit to a junction box, wherein said gasket ring is an annular member defining along the axis thereof a first end face and a second end face opposing said first end face, said first end face having a plurality of concentrically arranged annular ribs, said second end face having an annular convex portion, wherein said cable gland comprises a connection ring connected to the junction box, said connection ring comprising a stop flange segment, a first connection ring segment axially extended from one side of said stop flange segment and a first outer thread extending around the periphery of said first connection ring segment for mounting, said stop flange segment having a stop face abutted against said first connection ring segment; said gasket ring is mounted on the first connection ring segment of said connection ring for enabling the annular ribs at said first end face to be stopped against the stop face of said stop flange segment of said connection ring, and wherein said packing ring has a hooked portion inwardly protruded from and extending along an inside wall thereof for engaging into a groove on flexible conduit being inserted with a cable into the cable gland.

* * * * *